July 9, 1940.    R. Q. SHORT    2,207,640
AUTOMOBILE JACK
Filed March 6, 1939
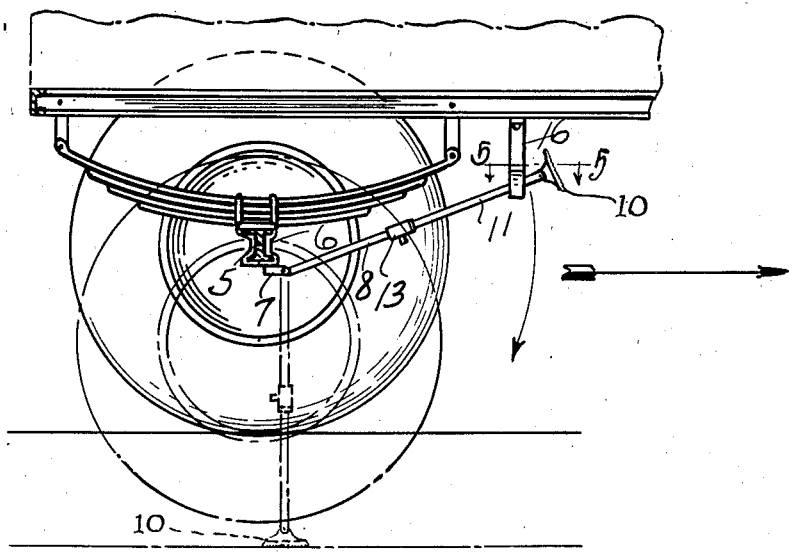
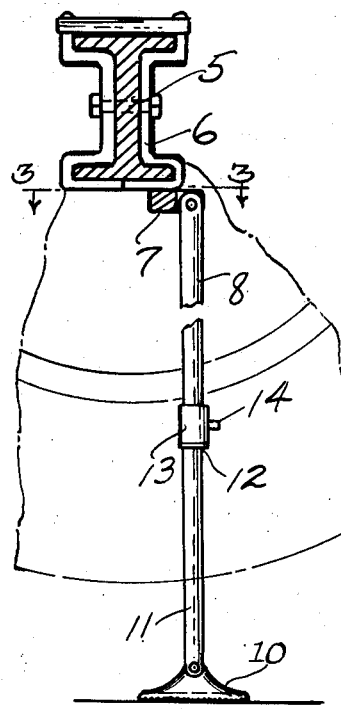
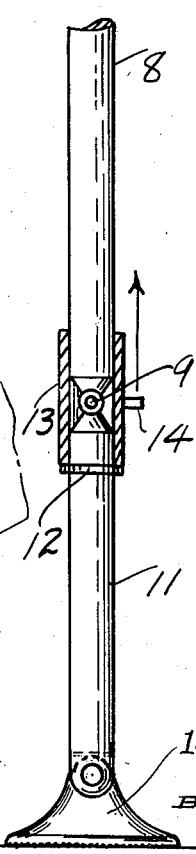
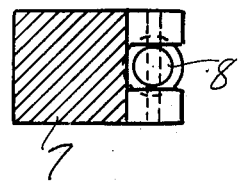
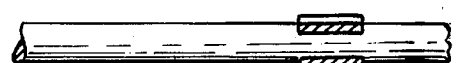
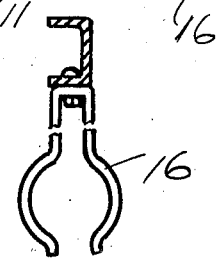
INVENTOR:
ROBERT Q. SHORT.
BY
ATTORNEYS.

Patented July 9, 1940

2,207,640

UNITED STATES PATENT OFFICE 2,207,640

AUTOMOBILE JACK

Robert Quirk Short, Honolulu, Territory of Hawaii

Application March 6, 1939, Serial No. 260,141

2 Claims. (Cl. 254—86)

This invention relates to improvements in automobile jacks wherein the movement of the car forward effects the lifting of the vehicle from the ground.

A further object of the invention is to produce a device which may be attached to any standard make of motor vehicle.

A further object is to produce a device which is economical to manufacture, and one which is simple to use.

Other objects and advantages will be apparent during the course of the following description.

In the accompanying drawing forming a part of this specification and in which like numerals are employed to designate like parts throughout the same.

Fig. 1 is a side elevation of my device, showing the axle and chassis parts in cross section;

Fig. 2 is an enlarged detailed view of the axle and jack;

Fig. 3 is an enlarged cross sectional view taken on the line 3—3 of Fig. 2;

Fig. 4 is an enlarged fragmentary view, showing the pivotal connection of the jack support;

Fig. 5 is an enlarged cross sectional view taken on the line 5—5 of Fig. 1; and

Fig. 6 is a side elevation of the jack holding clamp.

The ordinary vehicle is lifted from the highway by employing a jack which is placed under the axle and then rotated or worked manually so as to elevate the weight of the car. This is often a very difficult process; also, the hands and clothes become soiled from the grease on the jack.

Applicant has, therefore, devised a jack wherein it is merely a matter of letting down an elevating element, which contacts the road; and as the vehicle moves forward, elevates the vehicle.

In the accompanying drawing wherein for the purpose of illustration is shown a preferred embodiment of my invention, the numeral 5 designates an axle of a vehicle to which I attach a clamp 6, which clamp has a block 7 formed upon its under surface, to which is hinged a supporting bar 8, having hinged, as at 9, to its lower extremity a second supporting bar 11, having a pivoted foot 10 and a ring 12 formed contacted by a sliding sleeve 13, which has a finger piece 14.

Mounted upon the chassis and suspended therefrom is a clamp 16, the purpose of which will be later seen.

Assuming now that one of these devices is attached to the axle adjacent each of the wheels and that a puncture occurs in one of the wheels, the user merely drops the device from the position shown in Fig. 1 by releasing the bar 11 from the clamp 16. This bar 11 will contact the ground; and then by moving the vehicle forward, the part adjacent the particular wheel will be elevated until the bar 8 engages the block 7, which prevents pivotal action, and the particular wheel adjacent this arrangement will be elevated.

When it is desired to lower the wheel, the sleeve 13 is moved upwardly through the use of the finger piece 14, and then a slight tap upon the bar 8 or 11 will cause the same to bend on the hinge 9 and drop the vehicle on to the ground.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In combination with a motor vehicle axle, a clamp secured thereto, a block secured to the clamp below the axle and having a laterally extending bifurcated portion beyond a vertical line of the axle, and a bar pivoted in the bifurcated end of the block and the wall of the bifurcation limiting the pivotal action of said bar in one direction.

2. In combination with a motor vehicle axle, a clamp secured thereto, a block secured to the clamp below the axle and having a laterally extending bifurcated portion beyond a vertical line of the axle, a bar pivoted in the bifurcated end of the block and the wall of the bifurcation limiting the pivotal action of said bar in one direction, a foot pivoted to said bar and having a ring adjacent said pivot, and a sleeve sliding on said bar and adapted to enclose the pivotal connection thereof with said foot.

ROBERT QUIRK SHORT.